UNITED STATES PATENT OFFICE.

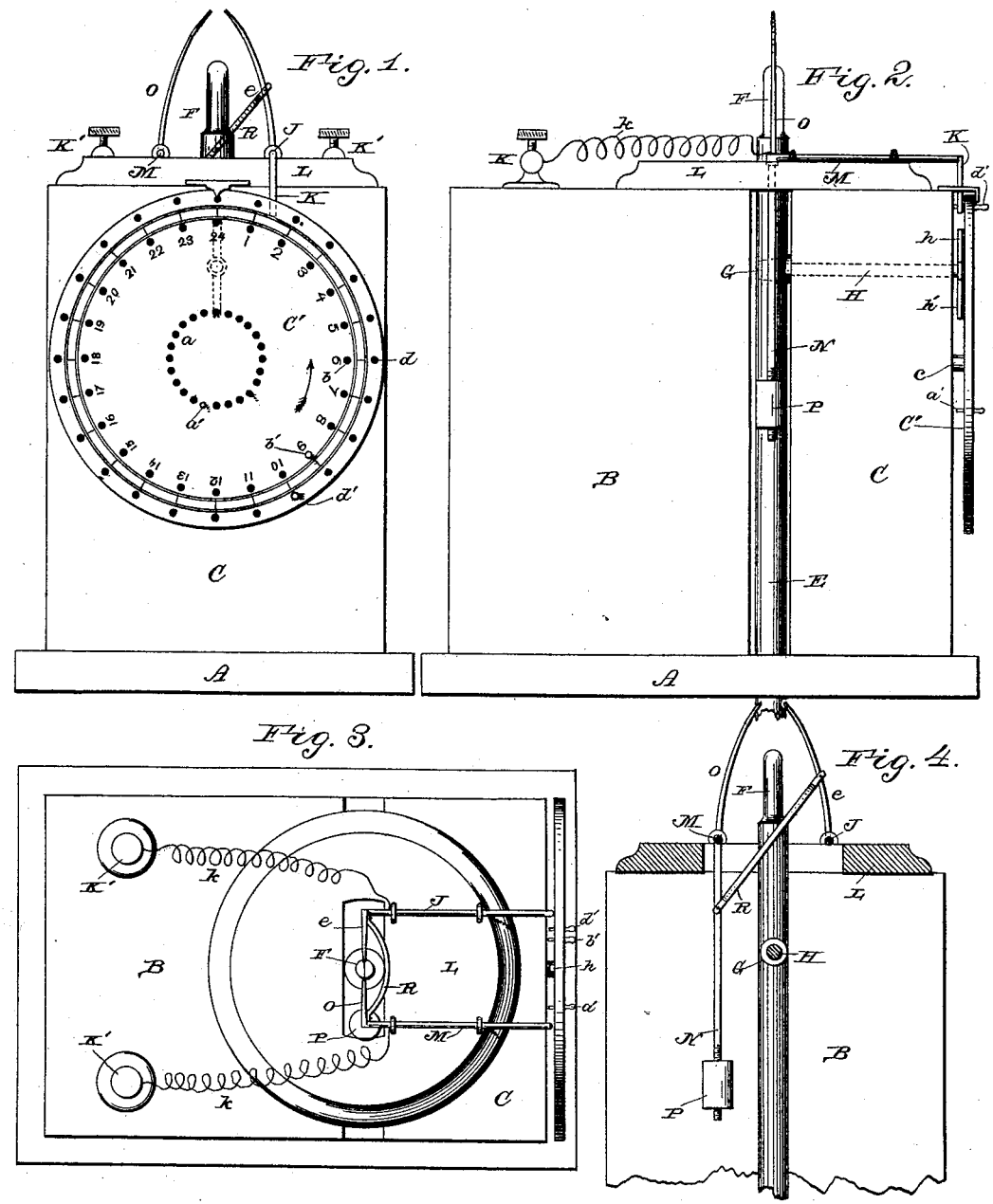

NELSON NEWMAN, OF SPRINGFIELD, ILLINOIS.

ELECTRIC GAS-LIGHTER.

SPECIFICATION forming part of Letters Patent No. 417,198, dated December 10, 1889.

Application filed September 11, 1889. Serial No. 323,626. (No model.)

*To all whom it may concern:*

Be it known that I, NELSON NEWMAN, of Springfield, county of Sangamon, State of Illinois, have invented a new and useful Improvement in Electric Gas Lighters and Extinguishers; and I do hereby declare that the following is a full, clear, and exact description of my invention, which will enable others skilled in the art to which it pertains to make and use it, reference being had to the accompanying drawings, forming a part thereof.

My invention relates to an improvement in electric gas lighters and extinguishers; and it consists in the peculiar construction and combination of devices that will be more fully set forth hereinafter, and particularly pointed out in the claims.

In the accompanying drawings, Figure 1 is a front elevation of an apparatus embodying my improvements. Fig. 2 is a side elevation of the same. Fig. 3 is a top plan view of the same. Fig. 4 is a transverse sectional view.

On the base A is supported a rectangular box or case B, of suitable size, and which incloses a suitable electric battery or other source of electricity. (Not shown.) I prefer to employ what is known in the art as a "dry battery;" but any suitable variety of battery may be used. A case C is also arranged on the base and at a suitable distance from one end of the battery-case.

In the case C is a suitable clock-work mechanism or other motor, (not shown,) having the shaft $c$ projecting through its front side, and the said shaft is adapted to revolve once in twenty-four hours, and carries a disk C'. I prefer to employ a clock mechanism which will continue to operate for sixteen days after being wound up; but this is not essential and may be varied at pleasure. The said disk is provided near the center and at a suitable distance from its perimeter with series of openings $a$ $b$, respectively. The said series of openings are arranged in concentric circles, are each twenty-four in number, corresponding to the hours of the day, and are numbered consecutively from one to twenty-four, as shown. The numbers of the said series of openings may be varied, if preferred, to suit the exact requirements of each case. Near the perimeter of the disk is a third series of openings $d$. A tappet-pin $a'$ is adapted to be inserted in either of the openings in series $a$ and to project from the rear side of the disk, and a similar pin $b'$ is adapted to be inserted in either of the openings in series $b$. The gas-pipe E extends through the base, and is arranged between the opposing ends of the battery and clock-work cases, and to the upper end of the said pipe is secured the burner F, which may be of any of the well-known forms. A valve G is journaled in a seat in the pipe, and is of such construction that a very slight movement will suffice to turn on or cut off the flow of gas. A shaft H projects from one end of the valve, and to the outer end of the shaft are attached a pair of tappet-arms $h$ $h'$ of unequal length and extending in opposite directions. The longer arm $h'$ is adapted to be engaged by the pin $a'$ in the series of openings $a$, and the shorter arm $h$ is adapted to be engaged by the pin $b'$ in the series of openings $b$. A plate L is secured on the upper sides of the cases B C, is circular in form, and has a central opening, through which the burner projects. A rock-shaft J is mounted in suitable bearings on the plate L, has its inner end upturned and curved inward to form a contact-arm $e$, and has its outer end bent downward at right angles to form a tappet-arm K, which is in the path of the tappet-pin $d'$ in the series of openings $d$. A rock-shaft M is also journaled in bearings on the plate, is parallel with the shaft J, and has its inner end provided with a contact-arm O, adapted to meet the arm $e$ at a point above the burner, and has a depending pendulum-arm N, provided with a pendulum P. A link-rod R connects the pendulum-arm to the contact-arm $e$. A pair of binding-posts K' are secured on the case B, and connected to the poles of the battery and to the shafts J and M, respectively, by conducting-wires $k$.

The operation of my invention is as follows: We will assume that it is required to light the gas at the ninth hour and extinguish it at the thirteenth hour. The pin $b'$ is inserted in the opening 9 of series $b$, the pin $a'$ is inserted in opening 13 of the series $a$, and the pin $d'$ is inserted in the appropriate opening (10) of series $d$. The axes of the valve and shaft J are not in vertical alignment, and therefore to compensate for this difference the pin $d'$ must be set a distance of one space in rear of pin $b'$. The clock-work mechanism being put in motion revolves the disk D in the direction indicated by the arrow in Fig. 1, and when the required time has elapsed the pin $b'$ will engage the arm or tappet $h$, and in moving past it turn the valve a sufficient distance to cause the gas to flow from the burner. It will be apparent from an inspection of Fig. 1 that before the pin $b'$ thus engages the arm $h$ the pin $d'$ will come in contact with the lever K, and will be slowly moving the same and turning the shaft J. The rod R and pendulum-rod to which it is attached will cause the shaft M to also turn in the opposite direction, with the result that the contact-arms will be moved farther from each other than ordinary. The length of the arm $h$ and the lever K must be such that at about the instant the pin $b'$ has moved past the arm $h$ and thereby turned on the gas the pin $d'$ will clear the lever K, and consequently set the pendulum in motion, thereby causing the contacting arms to move alternately to and from each other and alternately close and open the electric circuit, producing a series of electric sparks, which serve to ignite the gas. The correct lengths of the arm $h$ and lever K can be very readily determined by a skilled artisan when constructing the apparatus. When the hours intervening between the ninth and the thirteenth have elapsed, the pin $a'$ in opening 13 of series $a$ will engage the arm $h'$ of the valve-shaft, and in moving past the said arm will turn the valve a sufficient distance to cut off the flow of gas through the burner and thereby extinguish the light. As long as the motor or clock-work mechanism continues to operate, and while the adjustment above described is preserved, the gas will be lighted at the ninth hour and regularly extinguished at the thirteenth hour automatically and absolutely without the necessity of any attention other than to keep the battery and the motor at work.

Having thus described my invention, I claim—

1. The electric-spark-producing apparatus having the vibrating contact-arms forming electrodes and provided with the pendulum adapted to alternately meet and separate, and the devices, substantially as set forth, to set them in motion.

2. The combination of the disk and the mechanism to revolve it, the adjustable tappets fixed to the disk, the valve having the levers or arms, and the vibrating contact-arms having the lever to engage the tappets, and the pendulum to keep said arms in motion, substantially as described.

3. The combination, with the gas-burner and the valve having the tappet-arms, of the time mechanism having the revolving disk, the contacting arms forming electrodes and arranged to meet and separate above the burner, one of said contacting arms having the lever and the other having the pendulum, the rod connecting said contacting arms, for the purpose set forth, and the adjustable tappets arranged on the disk, substantially as described.

4. The combination, with the burner and the valve, of the electric-spark-producing apparatus having the vibrating contacting arms forming electrodes and provided with the pendulum adapted to alternately meet and separate near the tip of the burner, and the devices, substantially as set forth, to set them in motion.

In testimony that I claim the foregoing I hereto append my signature.

NELSON NEWMAN.

Witnesses:
WM. R. BOWERS,
BERTHA HEDERICK.